United States Patent
Harrison

[11] 3,815,276
[45] June 11, 1974

[54] CRAB LURE AND TRAP

[75] Inventor: Daniel A. Harrison, 29 Central Ave., Highlands, N.J. 07732

[22] Filed: June 26, 1973

[21] Appl. No.: 373,677

[52] U.S. Cl.......... 43/43.1, 43/42.7, 43/58
[51] Int. Cl. ............ A01k 95/00, A01m 23/00
[58] Field of Search ........... 43/58, 64, 77, 100, 4, 43/4.5, 43.1, 42, 42.7, 86, 87, 42.1, 1, 43.2, 42.39, 42.25, 42.42, 42.74

[56] References Cited
UNITED STATES PATENTS
| | | |
|---|---|---|
| 843,651 | 2/1907 | Willing ............. 43/43.1 |
| 2,185,668 | 1/1940 | Hurdle ............. 43/42.28 |
| 2,565,163 | 8/1951 | Ball ............. 43/43.1 |
| 3,359,674 | 12/1967 | Strumor ............. 43/42.28 |

Primary Examiner—Warner H. Camp
Attorney, Agent, or Firm—Howard I. Podell

[57] ABSTRACT

A crab lure and trap which is formed of two fishing weights joined together about a section of cloth material to which a number of long loops of fishing line are attached. The two halves of the fishing weight are attached to one another by means of a bolt, with a hook for holding bait attached to the lower section for the purpose of attracting a crab which then becomes entrapped in the attached long loops of fishing line.

2 Claims, 3 Drawing Figures

PATENTED JUN 11 1974   3,815,276

CRAB LURE AND TRAP

SUMMARY OF THE INVENTION

This invention relates to a crab lure and trap from which loops of fishing line extend and to which a hook is attached, such that when bait is placed on the hook a crab is attracted to the bait and is trapped in the loops of the fishing line.

The advantage of this invention is that the device provides a superior way of attracting and trapping crabs.

The invention comprises a weight which is separable into two halves. A piece of cloth material with external loops of fishing line is fastened between the two halves of the weight which are attached together by means of a bolt. The external end of the bolt is shaped in the form of a hook-eye so that the device can be attached to the end of a fishing line. A bait hook is fastened to the lower half of the weight.

In use, a crab is attracted to the bait on the hook and becomes entrapped by the loops of fishing line which protrude from the device.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
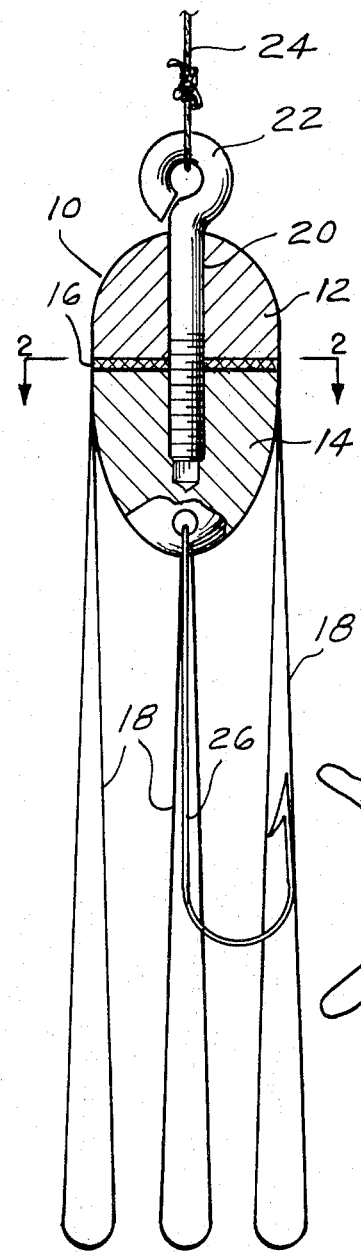
FIG. 1 is a front sectional view of the device.

Turning now descriptively to the drawings, in which similar reference characters denote similar elements throughout the several views, FIG. 1 illustrates the device 10 which consists of an upper weight 12 and a lower weight 14 joined together by an eyebolt 20 about a piece of material 16. Loops 18 of fishing line are attached to the piece of material 16. The external end of the bolt 20, which protrudes from the top half 12 of the fishing weight is shaped in the form of an eye 22 which is attached to a fishing line 24. The bottom half 14 of the fishing weight is attached to a bait hook 26. When the bait is placed on the hook 26, the crab is attracted to the device 10 by means of the bait and becomes entangled in the loops 18 of fishing line.

Figure 2:
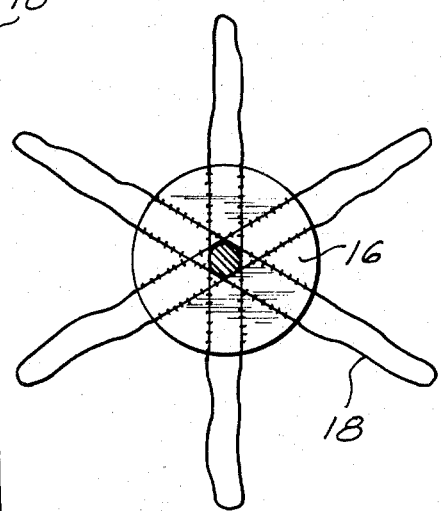
FIG. 2 is a top view of the piece of material with loops of fishing line attached.
Figure 3:
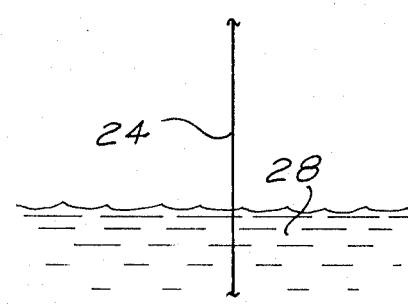
FIG. 3 is a front view of the device in use.
Figure 3:
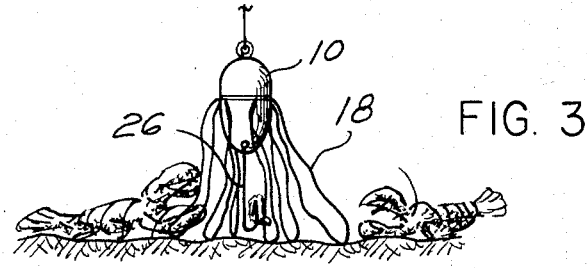

As depicted in FIG. 2, the material 16 which is placed between the two halves 12 and 14 of the fishing weight has a number of loops 18 of fishing line attached. The material 16 can be removed from between the two halves 12 and 14 of the fishing weight 10, and replaced or cleaned as desired.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A crab lure and trap for the catching of a crab which is formed of two weights joined together about a section of material from which loops of fishing line protrude externally of the assembly, said weights being joined by an eyebolt, the external end of which is adaptable for fastening to a fishing line.

2. The combination as described in claim 1 together with a bait hook which is fastened to the assembly so as to lure a crab, when said hook is baited, into an area surrounded by the attached protruding loops of fishing line.

* * * * *